United States Patent
Xu et al.

(10) Patent No.: US 9,986,497 B2
(45) Date of Patent: May 29, 2018

(54) METHOD AND DEVICE FOR MESSAGE PROCESSING BETWEEN COMMUNICATIONS SYSTEMS

(71) Applicant: Huawei Technologies Co., Ltd., Shenzhen, Guangdong (CN)

(72) Inventors: Kai Xu, Shanghai (CN); Liwen Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 14/748,790

(22) Filed: Jun. 24, 2015

(65) Prior Publication Data

US 2015/0296448 A1 Oct. 15, 2015

Related U.S. Application Data

(63) Continuation of application No. PCT/CN2012/087904, filed on Dec. 28, 2012.

(51) Int. Cl.
| | |
|---|---|
| *H04W 48/18* | (2009.01) |
| *H04W 24/08* | (2009.01) |
| *H04W 76/02* | (2009.01) |
| *H04W 24/04* | (2009.01) |
| *H04W 88/06* | (2009.01) |
| *H04W 88/12* | (2009.01) |
| *H04W 36/14* | (2009.01) |
| *H04W 36/00* | (2009.01) |

(52) U.S. Cl.
CPC .......... *H04W 48/18* (2013.01); *H04W 24/04* (2013.01); *H04W 24/08* (2013.01); *H04W 76/021* (2013.01); *H04W 36/0022* (2013.01); *H04W 36/14* (2013.01); *H04W 88/06* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 6,826,161 B1 * | 11/2004 | Shahidi | H04W 36/245 370/331 |
| 2002/0112045 A1 | 8/2002 | Nirkhe et al. | |

(Continued)

FOREIGN PATENT DOCUMENTS

| | | |
|---|---|---|
| CN | 101098546 A | 1/2008 |
| CN | 101257708 A | 9/2008 |

(Continued)

OTHER PUBLICATIONS

"CSFB MRO-USE CASE", Vodafone, 3GPP TSG RAN WG3 #74, Nov. 14-18, 2011, 2 pages, R3-112761.

(Continued)

*Primary Examiner* — Candal Elpenord

(57) ABSTRACT

A method includes: acquiring a first report message of an operation event in a source system; acquiring a second report message of the operation event in a target system; and correlating the first report message with the second report message according to the first user equipment identifier and the second user equipment identifier, and performing event statistics collection according to the correlated first report message and second report message.

20 Claims, 5 Drawing Sheets

(56) References Cited

U.S. PATENT DOCUMENTS

| | | | |
|---|---|---|---|
| 2004/0259547 A1* | 12/2004 | Lau | H04W 36/30 |
| | | | 455/436 |
| 2007/0258436 A1 | 11/2007 | Kulkarni et al. | |
| 2009/0227251 A1 | 9/2009 | Lei et al. | |
| 2010/0189248 A1 | 7/2010 | Ding et al. | |
| 2011/0044283 A1* | 2/2011 | Rubin | H04W 8/02 |
| | | | 370/331 |
| 2012/0021744 A1* | 1/2012 | Chin | H04L 1/0029 |
| | | | 455/436 |
| 2012/0064892 A1 | 3/2012 | Kim | |
| 2012/0110193 A1 | 5/2012 | Zhou et al. | |
| 2012/0155428 A1* | 6/2012 | Bovo | H04L 43/18 |
| | | | 370/331 |
| 2012/0230219 A1* | 9/2012 | Pettersson | H04W 36/24 |
| | | | 370/252 |
| 2012/0282968 A1 | 11/2012 | Toskala et al. | |

FOREIGN PATENT DOCUMENTS

| | | |
|---|---|---|
| CN | 101330741 A | 12/2008 |
| CN | 101534500 A | 9/2009 |
| CN | 101627584 A | 1/2010 |
| CN | 101959257 A | 1/2011 |
| CN | 102547675 A | 7/2012 |
| CN | 102572925 A | 7/2012 |
| WO | WO 2013/007291 A1 | 1/2013 |

OTHER PUBLICATIONS

"3rd Generation Partnership Project; Technical Specification Group Core Network and Terminals; Numbering, addressing and identification,(Release 11)", 3GPP TS 23.003 V11.4.0, Dec. 2012, 83 pages.

* cited by examiner

US 9,986,497 B2

1

METHOD AND DEVICE FOR MESSAGE PROCESSING BETWEEN COMMUNICATIONS SYSTEMS

CROSS-REFERENCE TO RELATED APPLICATIONS

This application is a continuation of International Application No. PCT/CN2012/087904, filed on Dec. 28, 2012, which is hereby incorporated by reference in its entirety.

TECHNICAL FIELD

Embodiments of the present invention relate to communications technologies, and in particular, to a method and a device for message processing between communications systems.

BACKGROUND

With development of wireless communications technologies and massive application of the Global System for Mobile Communications (Global System for Mobile Communications, GSM for short), the Universal Mobile Telecommunications System (Universal Mobile Telecommunications System, UMTS for short), and the Long Term Evolution (Long Term Evolution, LTE for short) system, a wireless network is increasingly complicated in structure. To provide a user with better network services, interoperations between the GSM, UMTS, and LTE are increasingly frequent.

In the prior art, interoperation actions between communications systems primarily include two major categories: handover between the communications systems and redirection between the communications systems. Currently, redirection is an interoperation manner that is relatively widely applied. Redirection in current protocols supports "blind" redirection in which only a frequency channel number is carried and a user equipment (User Equipment, UE for short) itself selects a cell, and supports redirection in which a frequency channel number and a cell identifier are carried, that is, the UE performs redirection in an indicated cell preferentially. With the "blind" redirection used as an example, a source system sends a radio resource control protocol message to a UE, where the message carries a frequency channel number of a target system to instruct the UE to get redirected to the target system.

However, once the source system issues a redirection command, information exchange between the UE and the source system is ended, and a context of the user is deleted from the source system. In addition, after the user accesses a new system, the new system does not notify the source system. Therefore, whether the UE accesses a different system successfully as instructed by the redirection command cannot be learned; as a result, statistics of events of user access to the different system cannot be collected.

SUMMARY

Embodiments of the present invention provide a method and a device for message processing between communications systems, which are used to collect statistics of events between communications systems.

According to a first aspect, an embodiment of the present invention provides a method for message processing between communications systems, including:

2 acquiring a first report message of an operation event in a source system, where the first report message includes a first user equipment identifier;

acquiring a second report message of the operation event in a target system, where the second report message includes a second user equipment identifier; and correlating the first report message with the second report message according to the first user equipment identifier and the second user equipment identifier, and performing event statistics collection according to the correlated first report message and second report message.

With reference to the first aspect, in a first possible implementation manner, the acquiring a first report message of an operation event in a source system, where the first report message includes a first user equipment identifier, includes: receiving a first report message sent by a device in the source system, where the first report message includes an international mobile subscriber identity IMSI;

the acquiring a second report message of the operation event in a target system, where the second report message includes a second user equipment identifier, includes: receiving a second report message sent by a device in the target system, where the second report message includes the IMSI; and the correlating the first report message with the second report message according to the first user equipment identifier and the second user equipment identifier includes: correlating the first report message with the second report message according to the IMSI in the first report message and the IMSI in the second report message.

With reference to the first possible implementation manner of the first aspect, in a second possible implementation manner, the source system is a Global System for Mobile Communications GSM or Universal Mobile Telecommunications System UMTS, and the target system is the GSM or UMTS.

With reference to the first aspect, in a third possible implementation manner, the acquiring a first report message of an operation event in a source system, where the first report message includes a first user equipment identifier, includes: receiving a first report message, sent by a mobility management entity MME, of an operation event in a Long Term Evolution network LTE system, where the first report message includes an IMSI;

the acquiring a second report message of the operation event in a target system, where the second report message includes a second user equipment identifier, includes: receiving a second report message sent by a device in the target system, where the second report message includes the IMSI; and the correlating the first report message with the second report message according to the first user equipment identifier and the second user equipment identifier includes: correlating the first report message with the second report message according to the IMSI in the first report message and the IMSI in the second report message.

With reference to the first aspect, in a fourth possible implementation manner, the acquiring a first report message of an operation event in a source system, where the first report message includes a first user equipment identifier, includes: receiving a first report message, sent by a device in the source system, of an operation event in an LTE system, where the first report message includes a temporary mobile subscriber identity TMSI;

the acquiring a second report message of the operation event in a target system, where the second report message includes a second user equipment identifier, includes:

receiving a second report message sent by a device in the target system, where the second report message includes an IMSI and the TMSI; and the correlating the first report message with the second report message according to the first user equipment identifier and the second user equipment identifier includes: correlating the first report message with the second report message according to the TMSI in the first report message and the TMSI in the second report message, where the correlated first report message and second report message correspond to the IMSI.

With reference to the first aspect, in a fifth possible implementation manner, the acquiring a first report message of an operation event in a source system, where the first report message includes a first user equipment identifier, includes: receiving a first report message, sent by a device in the source system, of an operation event in an LTE system, where the first report message includes a preset user identifier;

the acquiring a second report message of the operation event in a target system, where the second report message includes a second user equipment identifier, includes: receiving a second report message sent by a device in the target system, where the second report message includes an IMSI and the preset subscriber identifier; and the correlating the first report message with the second report message according to the first user equipment identifier and the second user equipment identifier includes: correlating the first report message with the second report message according to the preset subscriber identifier in the first report message and the preset subscriber identifier in the second report message, where the correlated first report message and second report message correspond to the IMSI.

With reference to the first aspect, in a sixth possible implementation manner, the acquiring a first report message of an operation event in a source system, where the first report message includes a first user equipment identifier, includes: receiving a first report message sent by a device in the source system, where the first report message includes an IMSI and the preset subscriber identifier;

the acquiring a second report message of the operation event in a target system, where the second report message includes a second user equipment identifier, includes: receiving a second report message, sent by a device in the target system, of an operation event in an LTE system, where the second report message includes the preset subscriber identifier; and the correlating the first report message with the second report message according to the first user equipment identifier and the second user equipment identifier includes: correlating the first report message with the second report message according to the preset subscriber identifier in the first report message and the preset subscriber identifier in the second report message, where the correlated first report message and second report message correspond to the IMSI.

With reference to the first aspect, in a seventh possible implementation manner, the acquiring a first report message of an operation event in a source system, where the first report message includes a first user equipment identifier, includes: receiving a first report message sent by a device in the source system, where the first report message includes the IMSI;

the acquiring a second report message of the operation event in a target system, where the second report message includes a second user equipment identifier, includes: receiving a second report message, sent by a mobility management entity MME, of an operation event in a Long Term Evolution network LTE system, where the second report message includes the IMSI; and the correlating the first report message with the second report message according to the first user equipment identifier and the second user equipment identifier includes: correlating the first report message with the second report message according to the IMSI in the first report message and the IMSI in the second report message.

With reference to the first aspect, in an eighth possible implementation manner, the acquiring a first report message of an operation event in a source system, where the first report message includes a first user equipment identifier, includes: receiving a first report message sent by a device in the source system, where the first report message includes an IMSI and the TMSI;

the acquiring a second report message of the operation event in a target system, where the second report message includes a second user equipment identifier, includes: receiving a second report message, sent by a target device, of an operation event in an LTE system, where the second report message includes the temporary mobile subscriber identity TMSI; and the correlating the first report message with the second report message according to the first user equipment identifier and the second user equipment identifier includes: correlating the first report message with the second report message according to the TMSI in the first report message and the TMSI in the second report message, where the correlated first report message and second report message correspond to the IMSI.

With reference to the first aspect or any one possible implementation manner of the first possible implementation manner to the eighth possible implementation manner of the first aspect, in a ninth possible implementation manner, before the correlating the first report message with the second report message, the method further includes:

determining that the first user equipment identifier is consistent with the second user equipment identifier, and determining whether a time interval between the acquiring of the first report message and the acquiring of the second report message is less than a preset valid time;

the correlating the first report message with the second report message is specifically:

if the time interval is less than the preset valid time, correlating the first report message with the second report message.

With reference to the first aspect or any one possible implementation manner of the first possible implementation manner to the ninth possible implementation manner of the first aspect, in a tenth possible implementation manner, the event statistics collection includes anyone of the following statistics collection or a combination thereof:

statistics collection of a success rate of redirection from the source system to the target system;

statistics collection of a delay of the redirection from the source system to the target system;

statistics collection of a success rate of a handover between the source system and the target system;

statistics collection of a delay of the handover between the source system and the target system; and statistics collection of signaling tracing between the source system and the target system.

With reference to the first aspect or any one possible implementation manner of the first possible implementation manner to the ninth possible implementation manner of the first aspect, in an eleventh possible implementation manner, the event statistics collection includes any one of the following statistics collection or a combination thereof:
statistics collection of subscriber-level events;
statistics collection of cell-level events;
statistics collection of network element-level events; and
statistics collection of system-level events.

According to a second aspect, an embodiment of the present invention provides a method for message processing between communications systems, including:
determining, by a first system, triggering of an operation event; and
sending, by the first system, an operation event report message to a centralized controller, where the operation event report message includes a user equipment identifier so that the centralized controller performs, according to the user equipment identifier in the operation event report message, correlation with an operation event report message sent by a second system, where
the first system is a source system corresponding to the operation event, and the second system is a target system corresponding to the operation event; or, the first system is a target system corresponding to the operation event, and the second system is a source system corresponding to the operation event.

With reference to the second aspect, in a first possible implementation manner, the user equipment identifier in the operation event report message is an IMSI.

With reference to the second aspect, in a second possible implementation manner, the user equipment identifier in the operation event report message is a combination of an IMSI and a TMSI.

With reference to the second aspect, in a third possible implementation manner, the user equipment identifier in the operation event report message is a preset user equipment identifier.

With reference to the third possible implementation manner of the second aspect, in a fourth possible implementation manner, if the first system is the source system, the second system is the target system, and the source system is an LTE system, before the sending, by the first system, an operation event report message to a centralized controller, the method further includes:
sending, by the source system, the preset user equipment identifier to the target system through a core network.

With reference to the second aspect or any one possible implementation manner of the first possible implementation manner to the fourth possible implementation manner of the second aspect, in a fifth possible implementation manner, the first system or the second system is one system of a Global System for Mobile Communications, a Universal Mobile Telecommunications System, and a Long Term Evolution system.

With reference to the fifth possible implementation manner of the second aspect, in a sixth possible implementation manner, if the first system is a Long Term Evolution system, the method further includes:
sending, by the first system, the IMSI to the centralized controller by using a mobility management entity MME.

According to a third aspect, an embodiment of the present invention provides a centralized controller, including:
a first acquiring module, configured to acquire a first report message of an operation event in a source system, where the first report message includes a first user equipment identifier;

a second acquiring module, configured to acquire a second report message of the operation event in a target system, where the second report message includes a second user equipment identifier; and
a processing module, configured to correlate the first report message with the second report message according to the first user equipment identifier and the second user equipment identifier, and perform event statistics collection according to the correlated first report message and second report message.

With reference to the third aspect, in a first possible implementation manner, the first acquiring module is specifically configured to receive a first report message sent by a device in the source system, where the first report message includes an international mobile subscriber identity IMSI;
the second acquiring module is specifically configured to receive a second report message sent by a device in the target system, where the second report message includes the IMSI; and
the processing module is specifically configured to correlate the first report message with the second report message according to the IMSI in the first report message and the IMSI in the second report message.

With reference to the first possible implementation manner of the third aspect, in a second possible implementation manner, the source system is a Global System for Mobile Communications GSM or Universal Mobile Telecommunications System UMTS, and the target system is the GSM or UMTS.

With reference to the third aspect, in a third possible implementation manner, the first acquiring module is specifically configured to receive a first report message, sent by a mobility management entity MME, of an operation event in a Long Term Evolution LTE system, where the first report message includes an IMSI;
the second acquiring module is specifically configured to receive a second report message sent by a device in the target system, where the second report message includes the IMSI; and
the processing module is specifically configured to correlate the first report message with the second report message according to the IMSI in the first report message and the IMSI in the second report message.

With reference to the third aspect, in a fourth possible implementation manner, the first acquiring module is specifically configured to receive a first report message, sent by a device in the source system, of an operation event in an LTE system, where the first report message includes a temporary mobile subscriber identity TMSI;
the second acquiring module is specifically configured to receive a second report message sent by a device in the target system, where the second report message includes an IMSI and the TMSI; and
the processing module is specifically configured to correlate the first report message with the second report message according to the TMSI in the first report message and the TMSI in the second report message, where the correlated first report message and second report message correspond to the IMSI.

With reference to the third aspect, in a fifth possible implementation manner, the first acquiring module is specifically configured to receive a first report message, sent by a device in the source system, of an operation event in an LTE system, where the first report message includes a preset subscriber identifier; and
the second acquiring module is specifically configured to receive a second report message sent by a device in the target system, where the second report message includes an IMSI and the preset subscriber identifier; and the processing module is specifically configured to correlate the first report message with the second report message according to the preset subscriber identifier in the first report message and the preset subscriber identifier in the second report message, where the correlated first report message and second report message correspond to the IMSI.

With reference to the third aspect, in a sixth possible implementation manner, the first acquiring module is specifically configured to receive a first report message sent by a device in the source system, where the first report message includes an IMSI and the preset subscriber identifier;

the second acquiring module is specifically configured to receive a second report message, sent by a device in the target system, of an operation event in an LTE system, where the second report message includes the preset subscriber identifier; and the processing module is specifically configured to correlate the first report message with the second report message according to the preset subscriber identifier in the first report message and the preset subscriber identifier in the second report message, where the correlated first report message and second report message correspond to the IMSI.

With reference to the third aspect, in a seventh possible implementation manner, the first acquiring module is specifically configured to receive a first report message sent by a device in the source system, where the first report message includes the IMSI; and the second acquiring module is specifically configured to receive a second report message, sent by a mobility management entity MME, of an operation event in a Long Term Evolution network LTE system, where the second report message includes the IMSI; and the processing module is specifically configured to correlate the first report message with the second report message according to the IMSI in the first report message and the IMSI in the second report message.

With reference to the third aspect, in an eighth possible implementation manner, the first acquiring module is specifically configured to receive a first report message sent by a device in the source system, where the first report message includes an IMSI and the TMSI;

the second acquiring module is specifically configured to receive a second report message, sent by a target device, of an operation event in an LTE system, where the second report message includes the temporary mobile subscriber identity TMSI; and the processing module is specifically configured to correlate the first report message with the second report message according to the TMSI in the first report message and the TMSI in the second report message, where the correlated first report message and second report message correspond to the IMSI.

With reference to the third aspect or any one possible implementation manner of the first possible implementation manner to the eighth possible implementation manner of the third aspect, in a ninth possible implementation manner, before correlating the first report message with the second report message, the processing module is further configured to determine that the first user equipment identifier is consistent with the second user equipment identifier, and determine whether a time interval between the acquiring of the first report message and the acquiring of the second report message is less than a preset valid time; and the processing module is specifically configured to: if the time interval is less than the preset valid time, correlate the first report message with the second report message.

With reference to the third aspect or any one possible implementation manner of the first possible implementation manner to the ninth possible implementation manner of the third aspect, in a tenth possible implementation manner, the event statistics collection includes any one of the following statistics collection or a combination thereof:

statistics collection of a success rate of redirection from the source system to the target system;

statistics collection of a delay of the redirection from the source system to the target system;

statistics collection of a success rate of a handover between the source system and the target system;

statistics collection of a delay of the handover between the source system and the target system; and statistics collection of signaling tracing between the source system and the target system.

With reference to the third aspect or any one possible implementation manner of the first possible implementation manner to the ninth possible implementation manner of the third aspect, in an eleventh possible implementation manner, the event statistics collection includes any one of the following statistics collection or a combination thereof:

statistics collection of subscriber-level events;
statistics collection of cell-level events;
statistics collection of network element-level events; and
statistics collection of system-level events.

According to a fourth aspect, an embodiment of the present invention provides a network device, including:

a processing module, configured to make a first system determine triggering of an operation event; and a sending module, configured to make the first system send an operation event report message to a centralized controller, where the operation event report message includes a user equipment identifier so that the centralized controller performs, according to the user equipment identifier in the operation event report message, correlation with an operation event report message sent by a second system, where the first system is a source system corresponding to the operation event, and the second system is a target system corresponding to the operation event; or, the first system is a target system corresponding to the operation event, and the second system is a source system corresponding to the operation event.

With reference to the fourth aspect, in a first possible implementation manner, the user equipment identifier in the operation event report message is an IMSI.

With reference to the fourth aspect, in a second possible implementation manner, the user equipment identifier in the operation event report message is a combination of an IMSI and a TMSI.

With reference to the fourth aspect, in a third possible implementation manner, the user equipment identifier in the operation event report message is a preset user equipment identifier; and With reference to the third possible implementation manner of the fourth aspect, in a fourth possible implementation manner, if the first system is the source system, the second system is the target system, and the source system is an LTE system, the network device further includes a processing module, configured to make the source system send the preset user equipment identifier to the target system through a core network.

With reference to the fourth aspect and any one of the first possible implementation manner to the fourth possible implementation manner of the fourth aspect, in a fifth possible implementation manner, the first system or the second system is one system of a Global System for Mobile Communications, a Universal Mobile Telecommunications System, and a Long Term Evolution system.

With reference to the fifth possible implementation manner of the fourth aspect, in a sixth possible implementation manner, if the first system is a Long Term Evolution system, the processing module is further configured to make the first system send the IMSI to the centralized controller by using a mobility management entity MME.

According to a fifth aspect, an embodiment of the present invention provides a centralized controller, including a processor and a memory, where the memory stores executable instructions; and when the centralized controller runs, the processor communicates with the memory, and the processor executes the executable instructions to make the centralized controller execute the first aspect or any one of the first to the eleventh possible implementation manners of the first aspect.

According to a sixth aspect, an embodiment of the present invention provides a network device, including a processor and a memory, where the memory stores executable instructions; and when the network device runs, the processor communicates with the memory, and the processor executes the executable instructions to make the network device execute the second aspect and any one of the first to the sixth possible implementation manners of the second aspect.

According to a seventh aspect, an embodiment of the present invention provides a computer-readable medium, including computer-executable instructions, where the computer-executable instructions are used to make a centralized controller execute the first aspect and any one of the first to the eleventh possible implementation manners of the first aspect.

According to an eighth aspect, an embodiment of the present invention provides a computer-readable medium, including computer-executable instructions, where the computer-executable instructions are used to make a network device execute the second aspect and any one of the first to the sixth possible implementation manners of the second aspect.

The embodiments of the present invention provide a method and a device for message processing between communications systems. In the method, a centralized controller acquires a first report message of an operation event in a source system, acquires a second report message of the operation event in a target system, correlates the first report message with the second report message according to a first user equipment identifier and a second user equipment identifier, and performs event statistics collection according to the correlated first report message and second report message. Therefore, events such as a handover and redirection between systems can be transferred and aggregated between the systems, and event statistics can be collected for access of a user equipment to a different system.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
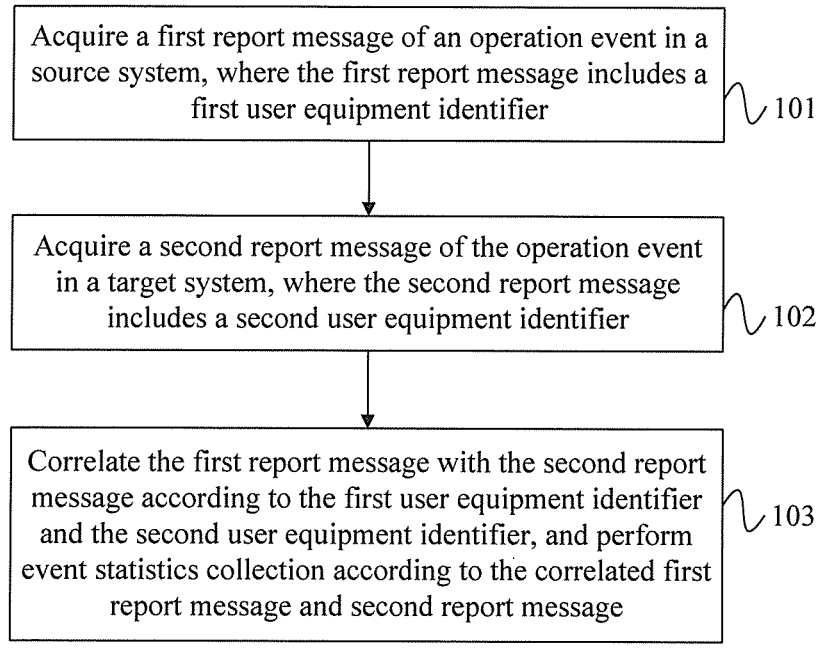
FIG. 1 is a flowchart of a method for message processing between communications systems according to Embodiment 1 of the present invention.

FIG. 1 is a flowchart of a method for message processing between communications systems according to Embodiment 1 of the present invention. This embodiment is executed by a centralized controller (ecoordinator), where the centralized controller may be a super network element connected to a radio network controller (Radio Network Controller, RNC for short) and/or a base station controller (Base Station Controller, BSC for short) and/or an evolved NodeB (Evolved Node B, eNodeB for short) and/or a network element of another radio standard. The centralized controller may be implemented by using software and/or hardware. As shown in FIG. 1, the method in this embodiment may include:

Step 101: Acquire a first report message of an operation event in a source system, where the first report message includes a first user equipment identifier;

Step 102: Acquire a second report message of the operation event in a target system, where the second report message includes a second user equipment identifier; and Step 103: Correlate the first report message with the second report message according to the first user equipment identifier and the second user equipment identifier, and perform event statistics collection according to the correlated first report message and second report message.

In this embodiment, the source system or the target system may be any one of a GSM, a UMTS, and an LTE systems, and the source system and the target system may be a same system or may be different systems. Operation events between the source system and the target system primarily include a handover and redirection. In a handover process, a service is not interrupted; redirection is performed after a service is interrupted.

First, an operation event of a UMTS system and a GSM system is used as an example. When a user equipment performs a voice service at a coverage edge of the UMTS system, signal quality of the UMTS system is relatively poor while signal quality of the GSM system is relatively good in the edge area. Therefore, the UMTS system makes the user equipment perform a communications system handover from the UMTS system to the GSM system. For the UMTS system, the UMTS system makes the user equipment perform the system handover, which is a handover operation event of the UMTS system; for the GSM system, a user equipment performs the handover to access the GSM system, which is a handover operation event of the GSM system. After the voice service of the user is completed, the GSM system makes the user equipment redirect the communications system from the GSM system to the UMTS system. For the GSM system, the GSM system makes the user equipment perform redirection, which is a redirection operation event of the GSM; for the UMTS, when the user equipment performs the redirection to access the UMTS system, a redirection operation event of the UMTS system occurs.

Next, an operation event of an LTE system and a UMTS system is used as an example. When a user equipment in the LTE system needs to perform a voice service, because the LTE system supports a data stream service but does not support the voice service, the LTE system makes a user equipment hand over from a packet-switched domain (Packet Switched, PS for short) of the LTE system to a PS domain of the UMTS system. For the LTE system, the LTE system makes the user equipment perform a system handover, which is a handover operation event of the LTE system; for the UMTS system, the user performs the handover to access the UMTS system, which is a handover operation event of the UMTS system. Subsequently, the UMTS system establishes a circuit-switched domain (Circuit Switch, CS for short), and the user equipment performs the voice service in the CS domain. After the voice service of the user is completed, the UMTS system makes the user equipment redirect the communications system from the UMTS system to the LTE system. For the UMTS system, the UMTS system makes the user equipment perform redirection, which is a redirection operation event of the UMTS; for the LTE, when the user equipment performs the redirection to access the LTE system, a redirection operation event of the LTE system occurs.

A person skilled in the art may understand that, in a specific application process, application scenarios of operation events between a source system and a target system are diversified. The foregoing application scenarios are merely exemplary, and this embodiment of the present invention does not particularly limit a specific application scenario.

When an operation event is performed between the source system and the target system, the source system and the target system may send report messages corresponding to a redirection or handover operation event to the centralized controller.

In step 101, after the source system sends a redirection or handover command to a user equipment, the source system may send the first report message of the operation event to the centralized controller, where the first report message includes the first user equipment identifier of the user equipment.

In step 102, after the user equipment accesses the target system, the target system may send the second report message of the operation event to the centralized controller, where the second report message includes the second user equipment identifier of the user equipment.

The first user equipment identifier may be a preset user equipment identifier or an international mobile subscriber identity (International Mobile Subscriber Identity, IMSI for short) or another user equipment identifier that can represent the user equipment.

In step 103, the centralized controller correlates the first report message with the second report message according to the first user equipment identifier and the second user equipment identifier, and performs the event statistics collection according to the correlated first report message and second report message.

In a specific implementation process, the centralized controller may receive multiple first report messages and multiple second report messages in a period of time, and correlate the multiple first report messages with the multiple second report messages according to the user equipment identifiers. When the first user equipment identifier is consistent with the second user equipment identifier, it indicates that the operation event is an operation event of a same user equipment, and therefore the first report messages are correlated with the second report messages according to the first user equipment identifier and the second user equipment identifier. That is, a correlation is established between the user equipment identifiers and related parameters such as a success rate and a delay of the operation event corresponding to the user equipment, and stored in the centralized controller, so that the centralized controller can perform event statistics collection according to correlated information. In a specific implementation process, the correlating the first report message with the second report message according to the first user equipment identifier and the second user equipment identifier may specifically include the following implementation manners:

In a possible implementation manner, the correlation is performed according to a mapping relationship. When the user equipment identifier in the first report message is consistent with that in the second report message, a mapping relationship between the user equipment identifier and the first report message and between the user equipment identifier and the second report message may be established. When information related to a user equipment needs to be acquired, the user equipment identifier is looked up, and the first report message and the second report message that are correlated with the user equipment identifier are acquired according to the mapping relationship.

In another possible implementation manner, the correlation is performed by using a multidimensional chart. When the user equipment identifier in the first report message is consistent with that in the second report message, a multidimensional chart may be created. In the multidimensional chart, dimensions may be the user equipment identifier, the first report message, and the second report message. Specifically, as shown in Table 1, when information related to a user needs to be acquired, the user equipment identifier is looked up in the multidimensional chart, and the first report message and the second report message that are correlated with the user equipment identifier are acquired.

TABLE 1

| User equipment identifier | First report message | Second report message |
|---|---|---|
| User equipment identifier 1 | First report message 1 | Second report message 1 |
| User equipment identifier 2 | First report message 2 | Second report message 2 |

In this embodiment of the present invention, a centralized controller acquires a first report message of an operation event in a source system, acquires a second report message of the operation event in a target system, correlates the first report message with the second report message according to a first user equipment identifier and a second user equipment identifier, and performs event statistics collection according to the correlated first report message and second report message. Therefore, events such as a handover and redirection between systems can be transferred and aggregated between the systems, and event statistics can be collected for access of a user equipment to a different system.

Figure 2:
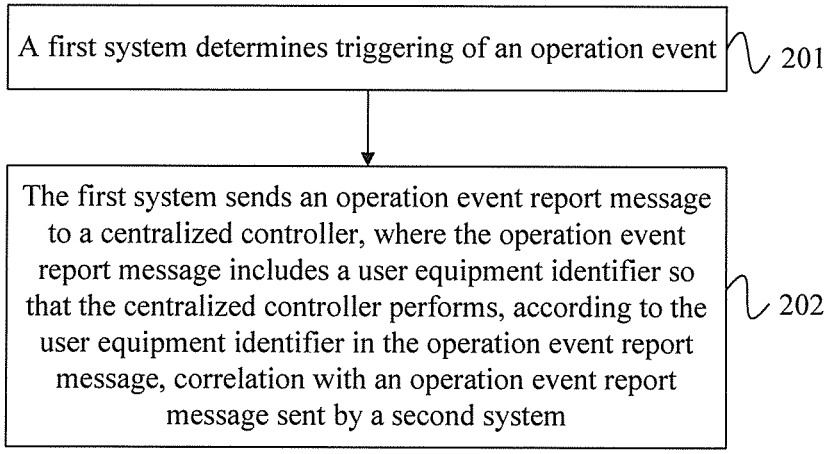
FIG. 2 is a flowchart of a method for message processing between communications systems according to Embodiment 2 of the present invention.

FIG. 2 is a flowchart of a method for message processing between communications systems according to Embodiment 2 of the present invention. This embodiment is executed by a radio access network device in various communications systems. An execution body in an LTE system is an eNodeB, an execution body in a GSM system is a BSC, and an execution body in a UMTS system is an RNC. The execution bodies may be implemented by using software and/or hardware. In this embodiment, the source system and the target system in the embodiment in FIG. 1 may be described in detail on the basis of the embodiment in FIG. 1. As shown in FIG. 2, the method in this embodiment may include the following steps:

Step 201: A first system determines triggering of an operation event.

Step 202: The first system sends an operation event report message to a centralized controller, where the operation event report message includes a user equipment identifier so that the centralized controller performs, according to the user equipment identifier in the operation event report message, correlation with an operation event report message sent by a second system.

The first system is a source system corresponding to the operation event, and the second system is a target system corresponding to the operation event; or, the first system is a target system corresponding to the operation event, and the second system is a source system corresponding to the operation event.

A person skilled in the art may understand that, in an interoperation process between systems, each communications system may be a source system and may also be a target system. When a user equipment is handed over in a cell in one communications system, the source system and the target system may be a same system.

When the first system is a source system and the second system is a target system, in step 201, the first system determines triggering of an operation event such as redirection or a handover, and sends related operation information to the user equipment. For redirection, the first system sends a connection release request message to the user equipment, where the connection release request message carries a frequency channel number of the second system so that the user equipment can access the second system. For an inter-system handover event, the first system may further request related resources from the second system, and after the related resources are obtained and available, send a handover command request message to the user equipment, where the handover command request message carries a specific cell identifier of the second system so that the user equipment can access a specified cell in the second system. In step 202, the first system sends the operation event report message to the centralized controller, where the operation event report message carries the user equipment identifier corresponding to the operation event so that the centralized controller performs, according to the user equipment identifier in the operation event report message, correlation with the operation event report message sent by the second system.

When the first system is a target system and the second system is a source system, and when the user accesses the first system in step 201, the first system determines triggering of an operation event. In step 202, the first system sends the operation event report message to the centralized controller, where the operation event report message includes the user equipment identifier so that the centralized controller performs, according to the user equipment identifier in the operation event report message, correlation with the operation event report message sent by the second system.

In this embodiment of the present invention, a first system determines triggering of an operation event, and the first system sends an operation event report message to a centralized controller, where the operation event report message includes a user equipment identifier so that the centralized controller performs, according to a user equipment identifier in the operation event report message, correlation with an operation event report message sent by a second system, where the first system is a source system corresponding to the operation event, and the second system is a target system corresponding to the operation event; or, the first system is a target system corresponding to the operation event, and the second system is a source system corresponding to the operation event. In an interoperation process, the target system and the source system send user equipment identifiers to the centralized controller, so that the centralized controller correlates, according to the user equipment identifiers, the operation event report message sent by the source system and the operation event report message sent by the target system, and according to the correlated operation event report messages, performs event statistics collection for access of the user equipment to a different system.

In the embodiments in FIG. 1 and FIG. 2, an operation event may be redirection or a handover. In an embodiment in FIG. 3 and an embodiment in FIG. 4, the operation events of redirection and handover are described in detail.

Figure 3:
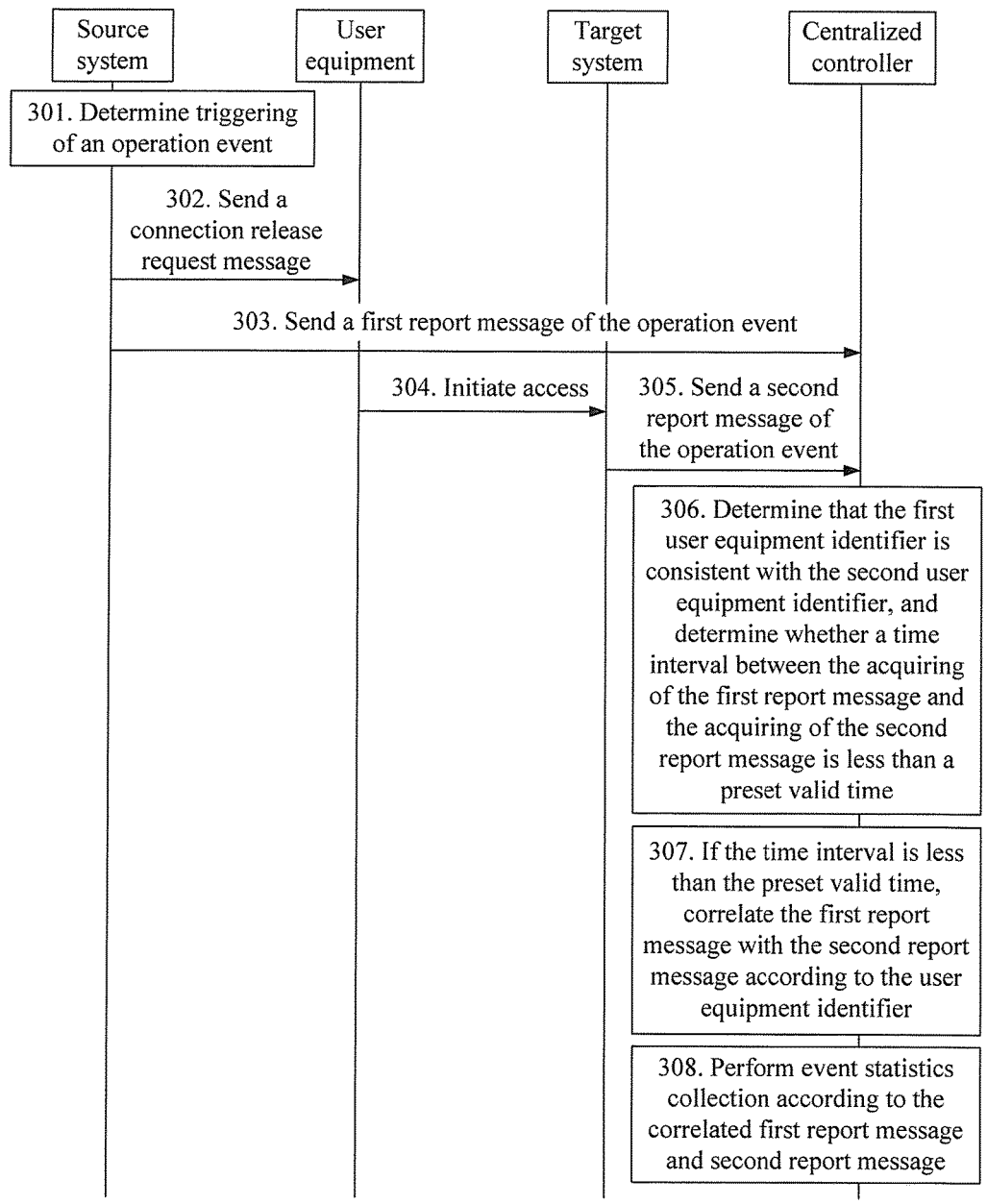
FIG. 3 is a signaling diagram of a method for message processing between communications systems according to Embodiment 3 of the present invention.

FIG. 3 is a signaling diagram of a method for message processing between communications systems according to Embodiment 3 of the present invention. The method for message processing between systems according to this embodiment is primarily a redirection operation between communications systems. Execution bodies in the systems are described briefly. An execution body in an LTE system is an eNodeB, an execution body in a GSM system is a BSC, and an execution body in a UMTS system is an RNC. The execution bodies may be implemented by using software and/or hardware. The centralized controller may be a super network element connected to an RNC and/or a BSC and/or an eNodeB and/or a network element of another radio standard. As shown in FIG. 3, the method for message processing between systems in this embodiment includes the following steps:

Step 301: A source system determines triggering of an operation event.

Step 302: The source system sends a connection release request message to a user equipment, where the connection release request message includes a frequency channel number of a target system.

Step 303: The source system sends a first report message of the operation event to a centralized controller.

Step 304: The user equipment initiates access to the target system.

Step 305: The target system sends a second report message of the operation event to the centralized controller.

Step 306: The centralized controller determines that a first user equipment identifier is consistent with a second user equipment identifier, and determines whether a time interval between the acquiring of the first report message and the acquiring of the second report message is less than a preset valid time.

Step 307: If the time interval is less than the preset valid time, the centralized controller correlates the first report message with the second report message according to the user equipment identifier.

Step 308: The centralized controller performs event statistics collection according to the correlated first report message and second report message.

A person skilled in the art may understand that the source system sending the first report message of the operation event to the centralized controller in step 303 is the same as the first system sending the operation event report message to the centralized controller in the embodiment in FIG. 2 when the first system is a source system corresponding to the operation event. That is, the two messages are equivalent, where the first report message includes a user equipment identifier.

The target system sending the second report message of the operation event to the centralized controller in step 305 is the same as the first system sending the operation event report message to the centralized controller in the embodiment in FIG. 2 when the first system is a target system corresponding to the operation event. That is, the two messages are equivalent, where the second report message includes a user equipment identifier.

In step 306, the centralized controller determines whether the time interval between the acquiring of the first report message and the acquiring of the second report message is less than the preset valid time. In a specific implementation process, the centralized controller may perform the determining by using a timer. When the centralized controller acquires a first report message that includes a first user equipment identifier, the centralized controller starts a timer. When the centralized controller acquires a second report message that includes a second user equipment identifier and the first user equipment identifier is consistent with the second user equipment identifier, it indicates that the redirection events of the source system and the target system are pertinent to the same user equipment. Therefore, the centralized controller shuts down the timer and reads a time in the timer, and this time is the time interval between receiving of the two messages pertinent to the same user equipment. When the time interval is less than the preset valid time, it indicates that the event is a valid event; and when the time interval is greater than the preset valid time, it indicates that the event is an invalid event.

In step 307, after it is determined that the time interval is less than the preset valid time, the centralized controller correlates the first report message with the second report message according to the user equipment identifier. A person skilled in the art may understand that, in this embodiment, the centralized controller performs correlation for only valid events but performs no correlation for invalid events.

In the method for message processing between systems according to this embodiment, a centralized controller determines whether a time interval between acquiring of a first report message and acquiring of a second report message is less than a preset valid time; if the time interval is less than the preset valid time, the centralized controller correlates the first report message with the second report message according to a user equipment identifier; and the centralized controller performs event statistics collection according to the correlated first report message and second report message, and can determine validity of an interoperation event. The first report message and the second report message are correlated according to only a user equipment identifier in a valid time, which improves reliability of correlation.

Figure 4:
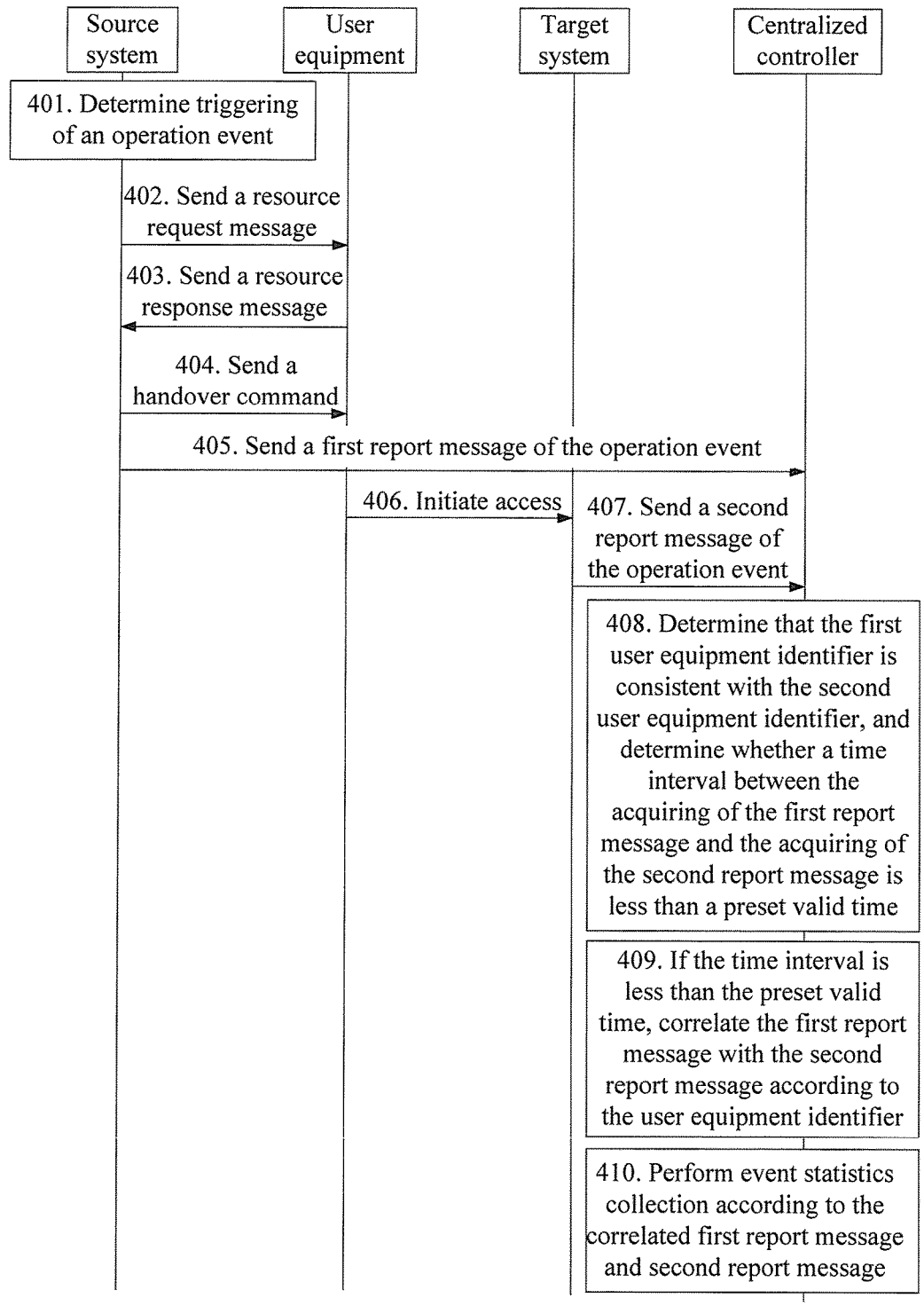
FIG. 4 is a signaling diagram of a method for message processing between communications systems according to Embodiment 4 of the present invention.

FIG. 4 is a signaling diagram of a method for message processing between communications systems according to Embodiment 4 of the present invention. The method for message processing between systems according to this embodiment is primarily a handover operation between communications systems. Execution bodies in the systems are described briefly. An execution body in an LTE system is an eNodeB, an execution body in a GSM system is a BSC, and an execution body in a UMTS system is an RNC. The execution bodies may be implemented by using software and/or hardware. The centralized controller may be a super network element connected to an RNC and/or a BSC and/or an eNodeB and/or a network element of another radio standard. As shown in FIG. 4, the method for message processing between systems in this embodiment includes the following steps:

Step 401: A source system determines triggering of an operation event.

Step 402: The source system sends a resource request message to a target system.

Step 403: The target system sends a resource response message to the source system.

Step 404: The source system sends a handover command to a user equipment.

Step 405: The source system sends a first report message of the operation event to a centralized controller;

Step 406: The user equipment initiates access to the target system.

Step 407: The target system sends a second report message of the operation event to the centralized controller.

Step 408: The centralized controller determines that a first user equipment identifier is consistent with a second user equipment identifier, and determines whether a time interval between the acquiring of the first report message and the acquiring of the second report message is less than a preset valid time.

Step 409: If the time interval is less than the preset valid time, the centralized controller correlates the first report message with the second report message according to the user equipment identifier.

Step 410: The centralized controller performs event statistics collection according to the correlated first report message and second report message.

In this embodiment, the handover operation may be a circuit-switched domain fallback (Circuit Switched Fall Back, CSFB) event. This embodiment differs from the embodiment in FIG. 3 in step 402 to step 404. After the source system determines the triggering of the operation event, the source system sends a resource request message to the target system to determine the target system has an available resource, and the target system sends a resource response message to the source system to notify the source system that an available resource exists. The source system sends a handover command to the user equipment, where the handover command includes a frequency channel number of the target system. Other steps in FIG. 4 are the same as corresponding steps in FIG. 3, and reference may be made to the embodiment in FIG. 3 and no repeated description is given in this embodiment.

Depending on differences between communications systems, the user equipment identifier in the embodiments in FIG. 1 to FIG. 4 may specifically come in the following scenarios.

In one scenario, when the source system and the target system are either a GSM or a UMTS, because an execution body BSC of the GSM system and an execution body RNC of the UMTS system can obtain an IMSI of the user equipment directly, the user equipment identifiers in the first report message and the second report message are IMSIs, and the centralized controller correlates the first report message with the second report message according to the IMSI in the first report message and the IMSI in the second report message.

In another scenario, when the source system and the target system are any one of a GSM or a UMTS or an LTE system, because an execution body eNodeB in the LTE system is unable to obtain an IMSI of the user equipment directly, the obtaining the user equipment identifier by the centralized controller in FIG. 1 to FIG. 4 includes the following possible implementation manners.

In one possible implementation manner, when the source system or the target system is an LTE system, the LTE system can acquire an IMSI of the user equipment by using a mobility management entity (Mobility Management Entity, MME for short) in a core network, and therefore, the centralized controller may be connected to the MME, and the centralized controller receives the first report message or second report message, sent by the MME, of the operation event in the LTE system, where the first report message and the second report message include the IMSI of the user equipment. With one embodiment used as an example, the user equipment sends an extended service request message (Extended Service Request) to the MME, where the message includes a CSFB indication. After receiving the indication, the MME notifies the eNodeB that the user needs to fall back to a 2G/3G system for a voice call. According to related information, the eNodeB selects a cell of a proper target system so that the user can fall back to a CS domain for a call connection. In addition, because the user equipment is undergoing a PS service, the eNodeB may send a handover request message to the MME to instruct the system to perform, for the user equipment, a normal handover process between different access technologies, so that the ongoing PS domain service of the user can continue. The handover request message may also instruct the MME to send the IMSI of the user equipment to the centralized controller. Correspondingly, when the source system or the target system is a GSM or UMTS, execution bodies in the two systems may directly send the first report message and the second report message that include the user equipment IMSI to the centralized controller, so that the centralized controller correlates the first report message with the second report message according to the IMSI in the first report message and the IMSI in the second report message.

In another possible implementation manner, when the source system or the target system is an LTE system, the user equipment identifier is a temporary mobile subscriber identity (Temporary Mobile Subscriber Identity, TMSI for short), and its type is M-TMSI. The user equipment identifier included in the first report message and the second report message that are sent by the eNodeB in the LTE system to the centralized controller is an M-TMSI. Correspondingly, when the source system or the target system is a GSM or UMTS, the user equipment identifier in the first report message or the second report message that is sent by the GSM or UMTS system to the centralized controller is a combination of an IMSI and a TMSI, where the TMSI is similar to a P-TMSI. According to a mapping rule for M-TMSIs and P-TMSIs, the centralized controller may determine whether meanings of the two are consistent. If the meanings of the two are consistent, the centralized controller may correlate the first report message with the second report message according to the TMSI, and make the correlated first report message and second report message correspond to the IMSI.

In still another possible implementation manner, when the source system is an LTE system, the user equipment identifier is a preset user equipment identifier. The preset user equipment identifier is a combination of an identifier of the LTE system and a robust security network (Robust Security Network, RSN for short), where a value range of the RSN is 0 to $2^{32}$. Therefore, the eNodeB in the LTE system sends a first report message that includes the preset user equipment identifier to the centralized controller while the eNodeB in the LTE system transmits the preset user equipment identifier to the target system transparently through a core network. A person skilled in the art may understand that the preset user equipment identifier may also be another identifier that is used to uniquely identify the user equipment. The target system may be a GSM or UMTS system. The target system may send a second report message that includes a combination of the preset user equipment identifier and an IMSI to the centralized controller. The centralized controller correlates the first report message with the second report message according to the preset user equipment identifier, and makes the correlated first report message and second report message correspond to the IMSI.

In yet another possible implementation manner, when the source system is a GSM or UMTS system, the user equipment identifier is a preset user equipment identifier. The preset user equipment identifier is a combination of an identifier of the LTE system and a robust security network (Robust Security Network, RSN for short), where a value range of the RSN is 0 to $2^{32}$. Therefore, the GSM or UMTS system may send a first report message that includes a combination of the preset user equipment identifier and an IMSI to the centralized controller while the GSM or UMTS system may transmit the preset user equipment identifier to the target system transparently through a core network. The target system may send a second report message that includes the preset user equipment identifier to the centralized controller. The centralized controller correlates the first report message with the second report message according to the preset user equipment identifier, and makes the correlated first report message and second report message correspond to the IMSI.

In conclusion, in the foregoing embodiments, because an IMSI is a constant symbol of a user equipment for distinguish a mobile subscriber and is stored in a SIM card, and may be used to distinguish validity information of a mobile subscriber, the finally correlated first report message and second report message both correspond to an IMSI. In a specific implementation process, two scenarios may exist, which are described below in detail.

In one possible scenario, when the user equipment identifier is an IMSI, a correlation between the IMSI, and the first report message and the second report message may be established directly. For a specific correlation, reference may be made to the correlation by mapping and the correlation by a multidimensional chart in the foregoing embodiment.

In another possible implementation manner, when the target system or the source system is an LTE system, and when a user equipment identifier in the LTE system is a TMSI or a preset user equipment identifier, a correlation between the TMSI or the preset user equipment identifier, and the first report message and the second report message is established first. For a specific correlation, reference may be made to the correlation by mapping and the correlation by a multidimensional chart in the foregoing embodiment. On the basis of this correlation, a correspondence may be established between the TMSI or the preset user equipment identifier and an IMSI may be established, a mapping relationship between the IMSI and the TMSI or the preset user equipment identifier may be established, and an IMSI field may be added to the multidimensional chart.

When the centralized controller performs event statistics collection, an IMSI may be retrieved, and then related information is obtained according to the IMSI.

This embodiment makes the correlated first report message and second report message correspond to an IMSI, which facilitates retrieval and makes a retrieval result universally applicable.

Preferably, in the embodiments in FIG. 1 to FIG. 4, the centralized controller performs event statistics collection according to the correlated first report message and second report message, where the event statistics collection includes any one of or a combination of the following statistics collection: statistics collection of a success rate of redirection from the source system to the target system, statistics collection of a delay of the redirection from the source system to the target system, statistics collection of a success rate of a handover between the source system and the target system, statistics collection of a delay of the handover between the source system and the target system, and statistics collection of signaling tracing between the source system and the target system. These are described below in detail one by one.

When the interoperation between the communications systems is redirection, statistics collection of a success rate of redirection from the source system to the target system and/or statistics collection of a delay of redirection from the source system to the target system may be performed. In a specific implementation process, when receiving a first report message that is sent by a source system device and inclusive of a user equipment identifier, the centralized controller records time of when the first report message is received, that is, start time of redirection; when receiving a second report message that is sent by a target system device and inclusive of the same user equipment identifier, the centralized controller records time when the second report message is received, that is, end time of redirection, and calculates a time interval between the start time and the end time. When the time interval is greater than a preset valid time, the redirection fails; and when the time interval is less than the preset valid time, the redirection succeeds. According to the foregoing description, the centralized controller may collect statistics of a success rate of redirection from the source system to the target system in a period of time. In addition, on the basis of successful redirection, the time interval is a redirection delay from the source system to the target system.

When the interoperation between the communications systems is a handover, the centralized controller may use a method similar to that for redirection to perform statistics collection of a success rate of a handover between the source system and the target system and statistics collection of a delay of the handover between the source system and the target system. A detailed statistics collection process is not further described herein in this embodiment.

Statistics collection of signaling tracing between the source system and the target system is described below. In a specific implementation process, execution bodies in the communications systems trace user-level signaling and transfer the signaling to the centralized controller, where the first report message and the second report message may include the user-level signaling. The centralized controller performs correlation for the signaling by using a user equipment identifier, and performs centralized display.

By using the statistics events provided in this embodiment, statistics of various interoperations between the target system and the source system can be collected, redirection and a handover between the communications systems can be analyzed according to the success rates, and user experience can be assessed according to the delay.

Preferably, in the embodiments in FIG. 1 to FIG. 4, the centralized controller performs event statistics collection according to the correlated first report message and second report message, where the event statistics collection includes any one of or a combination of the following statistics collection: statistics collection of user-level events, statistics collection of cell-level events, statistics collection of network element-level events, and statistics collection of system-level events. These are described below in detail one by one.

The statistics collection of user-level events refers to statistics collection, from a perspective of a user, of a success rate and/or a delay of user access to a target system; the statistics collection of cell-level events refers to statistics collection of inter-cell redirection or handover events in a same communications system or different communications systems; the statistics collection of network element-level events refers to statistics collection of interoperation events between network elements in different systems; and the statistics collection of system-level events refers to statistics collection of interoperation events between systems.

By using the statistics events provided in this embodiment, detailed information about interoperation events of all levels ranging from a user level to a system level can be obtained, which facilitates comprehensive analysis and statistics collection on the interoperation events.

Figure 5:
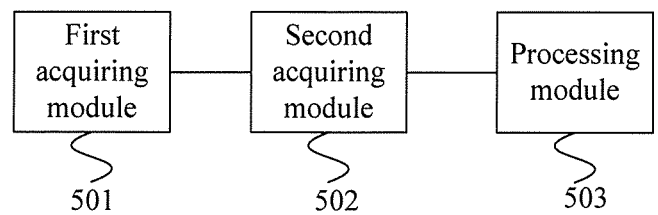
FIG. 5 is a schematic structural diagram of a centralized controller according to Embodiment 1 of the present invention.

FIG. 5 is a schematic structural diagram of a centralized controller according to Embodiment 1 of the present invention. The centralized controller may be a super network element connected to an RNC and/or a BSC and/or an eNodeB and/or a network element of another radio standard. As shown in FIG. 5, the centralized controller provided in this embodiment includes a first acquiring module 501, a second acquiring module 502, and a processing module 503.

The first acquiring module 501 is configured to acquire a first report message of an operation event in a source system, where the first report message includes a first user equipment identifier.

The second acquiring module 502 is configured to acquire a second report message of the operation event in a target system, where the second report message includes a second user equipment identifier.

The processing module 503 is configured to correlate the first report message with the second report message according to the first user equipment identifier and the second user equipment identifier, and perform event statistics collection according to the correlated first report message and second report message.

The centralized controller in this embodiment may be used to implement the technical solution in the method embodiment in FIG. 1 with a similar implementation principle and similar technical effects, and details are not described herein again.

Optionally, the first acquiring module 501 is specifically configured to receive a first report message sent by a device in the source system, where the first report message includes an international mobile subscriber identity IMSI;

the second acquiring module 502 is specifically configured to receive a second report message sent by a device in the target system, where the second report message includes the IMSI; and the processing module 503 is specifically configured to correlate the first report message with the second report message according to the IMSI in the first report message and the IMSI in the second report message.

Optionally, the source system is a Global System for Mobile Communications GSM or Universal Mobile Telecommunications System UMTS, and the target system is the GSM or UMTS.

Optionally, the first acquiring module 501 is specifically configured to receive a first report message, sent by a mobility management entity MME, of an operation event in a Long Term Evolution LTE system, where the first report message includes an IMSI;

the second acquiring module 502 is specifically configured to receive a second report message sent by a device in the target system, where the second report message includes the IMSI; and the processing module 503 is specifically configured to correlate the first report message with the second report message according to the IMSI in the first report message and the IMSI in the second report message.

Optionally, the first acquiring module 501 is specifically configured to receive a first report message, sent by a device in the source system, of an operation event in an LTE system, where the first report message includes a temporary mobile subscriber identity TMSI;

the second acquiring module 502 is specifically configured to receive a second report message sent by a device in the target system, where the second report message includes an IMSI and the TMSI; and the processing module 503 is specifically configured to correlate the first report message with the second report message according to the TMSI in the first report message and the TMSI in the second report message, where the correlated first report message and second report message correspond to the IMSI.

Optionally, the first acquiring module 501 is specifically configured to receive a first report message, sent by a device in the source system, of an operation event in an LTE system, where the first report message includes a preset subscriber identifier;

the second acquiring module 502 is specifically configured to receive a second report message sent by a device in the target system, where the second report message includes an IMSI and the preset subscriber identifier; and the processing module 503 is specifically configured to correlate the first report message with the second report message according to the preset subscriber identifier in the first report message and the preset subscriber identifier in the second report message, where the correlated first report message and second report message correspond to the IMSI.

Optionally, the first acquiring module 501 is specifically configured to receive a first report message sent by a device in the source system, where the first report message includes an IMSI and the preset subscriber identifier;

the second acquiring module 502 is specifically configured to receive a second report message, sent by a device in the target system, of an operation event in an LTE system, where the second report message includes the preset subscriber identifier; and the processing module 503 is specifically configured to correlate the first report message with the second report message according to the preset subscriber identifier in the first report message and the preset subscriber identifier in the second report message, where the correlated first report message and second report message correspond to the IMSI.

Optionally, the first acquiring module 501 is specifically configured to receive a first report message sent by a device in the source system, where the first report message includes the IMSI;

the second acquiring module 502 is specifically configured to receive a second report message, sent by a mobility management entity MME, of an operation event in a Long Term Evolution network LTE system, where the second report message includes the IMSI; and the processing module 503 is specifically configured to correlate the first report message with the second report message according to the IMSI in the first report message and the IMSI in the second report message.

Optionally, the first acquiring module 501 is specifically configured to receive a first report message sent by a device in the source system, where the first report message includes an IMSI and the TMSI;

the second acquiring module 502 is specifically configured to receive a second report message, sent by a target device, of an operation event in an LTE system, where the second report message includes the temporary mobile subscriber identity TMSI; and the processing module 503 is specifically configured to correlate the first report message with the second report message according to the TMSI in the first report message and the TMSI in the second report message, where the correlated first report message and second report message correspond to the IMSI.

Optionally, before correlating the first report message with the second report message, the processing module 503 is further configured to determine that the first user equipment identifier is consistent with the second user equipment identifier, and determine whether a time interval between the acquiring of the first report message and the acquiring of the second report message is less than a preset valid time; and the processing module 503 is specifically configured to: if the time interval is less than the preset valid time, correlate the first report message with the second report message.

Optionally, the event statistics collection includes any one of the following statistics collection or a combination thereof:

statistics collection of a success rate of redirection from the source system to the target system;

statistics collection of a delay of the redirection from the source system to the target system;

statistics collection of a success rate of a handover between the source system and the target system;

statistics collection of a delay of the handover between the source system and the target system; and statistics collection of signaling tracing between the source system and the target system.

Optionally, the event statistics collection includes any one of the following statistics collection or a combination thereof:

statistics collection of subscriber-level events;
statistics collection of cell-level events;
statistics collection of network element-level events; and
statistics collection of system-level events.

The centralized controller in this embodiment may be used to implement the technical solution in the foregoing method embodiment with a similar implementation principle and similar technical effects, and details are not described herein again.

Figure 6:
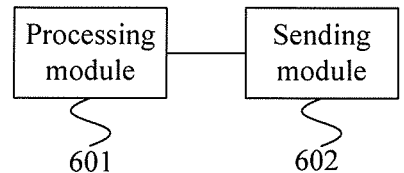
FIG. 6 is a schematic structural diagram of a network device according to Embodiment 1 the present invention.

FIG. 6 is a schematic structural diagram of a network device according to Embodiment 1 of the present invention. The network device may be a radio access network device such as an RNC and/or a BSC and/or an eNodeB. As shown in FIG. 6, the network device provided in this embodiment includes a processing module 601 and a sending module 602.

The processing module 601 is configured to make a first system determine triggering of an operation event.

The sending module 602 is configured to make the first system send an operation event report message to a centralized controller, where the operation event report message includes a user equipment identifier so that the centralized controller performs, according to the user equipment identifier in the operation event report message, correlation with an operation event report message sent by a second system, where the first system is a source system corresponding to the operation event, and the second system is a target system corresponding to the operation event; or, the first system is a target system corresponding to the operation event, and the second system is a source system corresponding to the operation event.

The network device in this embodiment may be used to implement the technical solution in the method embodiment in FIG. 2 with a similar implementation principle and similar technical effects, and details are not described herein again.

Optionally, the user equipment identifier in the operation event report message is an IMSI.

Optionally, the user equipment identifier in the operation event report message is a combination of an IMSI and a TMSI.

Optionally, the user equipment identifier in the operation event report message is a preset user equipment identifier.

Optionally, if the first system is the source system, the second system is the target system, and the source system is an LTE system, the processing module 601 is further configured to make the source system send the preset user equipment identifier to the target system through a core network.

Optionally, the first system or the second system is one system of a Global System for Mobile Communications, a Universal Mobile Telecommunications System, and a Long Term Evolution system.

Optionally, if the first system is a Long Term Evolution system, the processing module 601 is further configured to make the first system send the IMSI to the centralized controller by using a mobility management entity MME.

The network device in this embodiment may be used to implement the technical solution in the foregoing method embodiment with a similar implementation principle and similar technical effects, and details are not described herein again.

Figure 7:
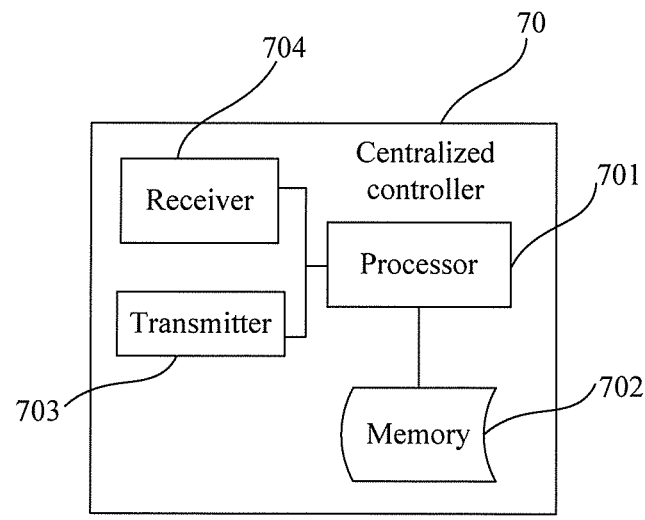
FIG. 7 is a schematic structural diagram of a centralized controller according to Embodiment 2 of the present invention.

FIG. 7 is a schematic structural diagram of a centralized controller according to Embodiment 2 of the present invention. As shown in FIG. 7, the centralized controller 70 provided in this embodiment includes a processor 701 and a memory 702. The centralized controller 70 may further include a transmitter 703 and a receiver 704. The transmitter 703 and the receiver 704 may be connected to the processor 701. The memory 702 stores executable instructions. When the centralized controller 70 runs, the processor 701 communicates with the memory 702, and the processor 701 invokes the executable instructions in the memory 702 to perform the following operations:

acquiring, by using the receiver 704, a first report message of an operation event in a source system, where the first report message includes a first user equipment identifier;

acquiring, by using the receiver 704, a second report message of the operation event in a target system, where the second report message includes a second user equipment identifier; and correlating the first report message with the second report message according to the first user equipment identifier and the second user equipment identifier, and performing event statistics collection according to the correlated first report message and second report message.

Optionally, the acquiring a first report message of an operation event in a source system, where the first report message includes a first user equipment identifier, includes:

receiving, by using the receiver 704, a first report message sent by a device in the source system, where the first report message includes an international mobile subscriber identity IMSI;

the acquiring a second report message of the operation event in a target system, where the second report message includes a second user equipment identifier, includes:

receiving, by using the receiver 704, a second report message sent by a device in the target system, where the second report message includes the IMSI;

the correlating the first report message with the second report message according to the first user equipment identifier and the second user equipment identifier includes:

correlating the first report message with the second report message according to the IMSI in the first report message and the IMSI in the second report message.

Optionally, the source system is a Global System for Mobile Communications GSM or Universal Mobile Telecommunications System UMTS, and the target system is the GSM or UMTS.

Optionally, the acquiring a first report message of an operation event in a source system, where the first report message includes a first user equipment identifier, includes:

receiving, by using the receiver 704, a first report message, sent by a mobility management entity MME, of an operation event in a Long Term Evolution LTE system, where the first report message includes an IMSI;

the acquiring a second report message of the operation event in a target system, where the second report message includes a second user equipment identifier, includes:

receiving, by using the receiver 704, a second report message sent by a device in the target system, where the second report message includes the IMSI; and the correlating the first report message with the second report message according to the first user equipment identifier and the second user equipment identifier includes:

correlating the first report message with the second report message according to the IMSI in the first report message and the IMSI in the second report message.

Optionally, the acquiring a first report message of an operation event in a source system, where the first report message includes a first user equipment identifier, includes:

receiving, by using the receiver 704, a first message, sent by a device in the source system, of an operation event in an LTE system, where the first report message includes a temporary mobile subscriber identity TMSI;

the acquiring a second report message of the operation event in a target system, where the second report message includes a second user equipment identifier, includes:

receiving, by using the receiver 704, a second report message sent by a device in the target system, where the second report message includes an IMSI and the TMSI; and the correlating the first report message with the second report message according to the first user equipment identifier and the second user equipment identifier includes:

correlating the first report message with the second report message according to the TMSI in the first report message and the TMSI in the second report message, where the correlated first report message and second report message correspond to the IMSI.

Optionally, the acquiring a first report message of an operation event in a source system, where the first report message includes a first user equipment identifier, includes:

receiving, by using the receiver 704, a first report message, sent by a device in the source system, of an operation event in an LTE system, where the first report message includes a preset user identifier;

the acquiring a second report message of the operation event in a target system, where the second report message includes a second user equipment identifier, includes:

receiving, by using the receiver 704, a second report message sent by a device in the target system, where the second report message includes an IMSI and the preset user identifier; and the correlating the first report message with the second report message according to the first user equipment identifier and the second user equipment identifier includes:

correlating the first report message with the second report message according to the preset user identifier in the first report message and the preset user identifier in the second report message, where the correlated first report message and second report message correspond to the IMSI.

Optionally, the first report message sent by a device in the source system is received by using receiver 704, where the first report message includes an IMSI and the preset user identifier;

a second report message, sent by a device in the target system, of an operation event in an LTE system is received by using the receiver 704, where the second report message includes the preset user identifier; and the first report message is correlated with the second report message according to the preset user identifier in the first report message and the preset user identifier in the second report message, where the correlated first report message and second report message correspond to the IMSI.

Optionally, the acquiring a first report message of an operation event in a source system, where the first report message includes a first user equipment identifier, includes:

receiving, by using the receiver 704, a first report message sent by a device in the source system, where the first report message includes the IMSI;

the acquiring a second report message of the operation event in a target system, where the second report message includes a second user equipment identifier, includes:

receiving, by using the receiver 704, a second report message, sent by a mobility management entity MME, of an operation event in a Long Term Evolution network LTE system, where the second report message includes the IMSI; and the correlating the first report message with the second report message according to the first user equipment identifier and the second user equipment identifier includes:

correlating the first report message with the second report message according to the IMSI in the first report message and the IMSI in the second report message.

Optionally, the acquiring a first report message of an operation event in a source system, where the first report message includes a first user equipment identifier, includes:

receiving, by using the receiver 704, a first report message sent by a device in the source system, where the first report message includes an IMSI and the TMSI;

the acquiring a second report message of the operation event in a target system, where the second report message includes a second user equipment identifier, includes:

receiving, by using the receiver 704, a second report message, sent by a target device, of an operation event in an LTE system, where the second report message includes the temporary mobile subscriber identity TMSI; and the correlating the first report message with the second report message according to the first user equipment identifier and the second user equipment identifier includes:

correlating the first report message with the second report message according to the TMSI in the first report message and the TMSI in the second report message, where the correlated first report message and second report message correspond to the IMSI.

Optionally, before the correlating the first report message with the second report message, the method further includes:

determining that the first user equipment identifier is consistent with the second user equipment identifier, and determining whether a time interval between the acquiring of the first report message and the acquiring of the second report message is less than a preset valid time; and the correlating the first report message with the second report message is specifically:

if the time interval is less than the preset valid time, correlating the first report message with the second report message.

Optionally, the event statistics collection includes any one of the following statistics collection or a combination thereof:

statistics collection of a success rate of redirection from the source system to the target system;

statistics collection of a delay of the redirection from the source system to the target system;

statistics collection of a success rate of a handover between the source system and the target system;

statistics collection of a delay of the handover between the source system and the target system; and statistics collection of signaling tracing between the source system and the target system.

Optionally, the event statistics collection includes any one of the following statistics collection or a combination thereof:

statistics collection of subscriber-level events;
statistics collection of cell-level events;
statistics collection of network element-level events; and
statistics collection of system-level events.

The centralized controller in this embodiment may be used to implement the technical solution in the foregoing method embodiment with a similar implementation principle and similar technical effects, and details are not described herein again.

An embodiment of the present invention provides a computer-readable medium, including computer-executable instructions, where the computer-executable instructions are used to make a centralized controller execute the foregoing method.

Figure 8:
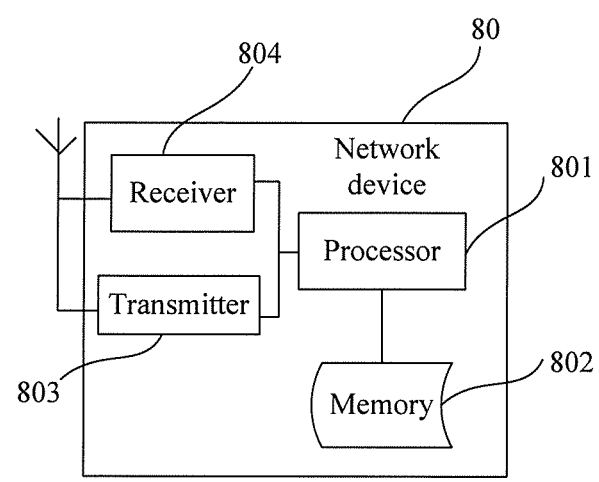
FIG. 8 is a schematic structural diagram of a network device according to Embodiment 2 of the present invention.

FIG. 8 is a schematic structural diagram of a network device according to Embodiment 2 of the present invention. As shown in FIG. 8, the network device 80 provided in this embodiment includes a processor 801 and a memory 802. The network device 80 may further include a transmitter 803 and a receiver 804. The transmitter 803 and the receiver 804 may be connected to the processor 801. The memory 802 stores executable instructions. When the network device 80 runs, the processor 801 communicates with the memory 802, and the processor 801 invokes the executable instructions in the memory 802 to perform the following operations:

determining, by a first system, triggering of an operation event; and sending, by the first system by using the transmitter 803, an operation event report message to a centralized controller, where the operation event report message includes a user equipment identifier so that the centralized controller performs, according to the user equipment identifier in the operation event report message, correlation with an operation event report message sent by a second system, where the first system is a source system corresponding to the operation event, and the second system is a target system corresponding to the operation event; or, the first system is a target system corresponding to the operation event, and the second system is a source system corresponding to the operation event.

Optionally, the user equipment identifier in the operation event report message is an IMSI.

Optionally, the user equipment identifier in the operation event report message is a combination of an IMSI and a TMSI.

Optionally, the user equipment identifier in the operation event report message is a preset user equipment identifier.

Optionally, if the first system is the source system, the second system is the target system, and the source system is an LTE system, before the sending, by the first system, an operation event report message to a centralized controller, the following is further included:

sending, by the source system by using the transmitter 803, the preset user equipment identifier to the target system through a core network.

Optionally, the first system or the second system is one system of a Global System for Mobile Communications, a Universal Mobile Telecommunications System, and a Long Term Evolution system.

Optionally, if the first system is a Long Term Evolution system, the following operation is further performed:

sending, by the first system, the IMSI to the centralized controller by using a mobility management entity MME.

The network device in this embodiment may be used to implement the technical solution in the foregoing method embodiment with a similar implementation principle and similar technical effects, and details are not described herein again.

An embodiment of the present invention provides a computer-readable medium, including computer-executable instructions, where the computer-executable instructions are used to make a network device execute the foregoing method.

In the several embodiments provided in the present application, it should be understood that the disclosed apparatus and method may be implemented in other manners. For example, the described apparatus embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for message processing between communications systems, comprising:

acquiring a first report message of an operation event in a source system at a first time, wherein the first report message comprises a first user equipment identifier;

acquiring a second report message of the operation event in a target system at a second time, wherein the second report message comprises a second user equipment identifier;

correlating the first report message with the second report message according to the first user equipment identifier and the second user equipment identifier, and, when a time interval between the first time and the second time is less than a preset valid time, then performing event statistics collection according to the correlated first report message and second report message; and storing a correlation result and the collected event statistics by a controller, wherein when the time interval is greater than the preset valid time, the operation event is determined to be an invalid event, and wherein when the time interval is less than the preset valid time, the operation event is determined to be an valid event, and a redirection operation is performed based on the operation event.

2. The method according to claim 1, wherein:

acquiring the first report message of the operation event in the source system, wherein the first report message comprises the first user equipment identifier, comprises: receiving the first report message sent by a device in the source system, wherein the first report message comprises an international mobile subscriber identity IMSI;

acquiring the second report message of the operation event in the target system, wherein the second report message comprises the second user equipment identifier, comprises: receiving the second report message sent by a device in the target system, wherein the second report message comprises the IMSI; and correlating the first report message with the second report message according to the first user equipment identifier and the second user equipment identifier comprises: correlating the first report message with the second report message according to the IMSI in the first report message and the IMSI in the second report message.

3. The method according to claim 1, wherein the event statistics collection comprises any one of the following statistics collection or a combination thereof:
   statistics collection of a success rate of redirection from the source system to the target system;
   statistics collection of a delay of the redirection from the source system to the target system;
   statistics collection of a success rate of a handover between the source system and the target system;
   statistics collection of a delay of the handover between the source system and the target system; and
   statistics collection of signaling tracing between the source system and the target system.

4. The method according to claim 2, wherein the event statistics collection comprises any one of the following statistics collection or a combination thereof:
   statistics collection of a success rate of redirection from the source system to the target system;
   statistics collection of a delay of the redirection from the source system to the target system;
   statistics collection of a success rate of a handover between the source system and the target system;
   statistics collection of a delay of the handover between the source system and the target system; and
   statistics collection of signaling tracing between the source system and the target system.

5. The method according to claim 1, wherein the event statistics collection comprises any one of the following statistics collection or a combination thereof:
   statistics collection of subscriber-level events;
   statistics collection of cell-level events;
   statistics collection of network element-level events; and
   statistics collection of system-level events.

6. The method according to claim 2, wherein the event statistics collection comprises any one of the following statistics collection or a combination thereof:
   statistics collection of subscriber-level events;
   statistics collection of cell-level events;
   statistics collection of network element-level events; and
   statistics collection of system-level events.

7. A centralized controller, comprising a processor and a memory, wherein the memory stores executable instructions; and when the centralized controller runs, the processor communicates with the memory, and the processor executes the executable instructions to make the centralized controller execute the method according to claim 1.

8. The centralized controller according to claim 7, wherein the processor is further configured to executes the executable instructions to make the centralized controller execute the method according to claim 2.

9. The centralized controller according to claim 7, wherein the processor is further configured to executes the executable instructions to make the centralized controller execute the method according to claim 3.

10. The centralized controller according to claim 7, wherein the processor is further configured to executes the executable instructions to make the centralized controller execute the method according to claim 4.

11. A non-transitory computer-readable medium, comprising computer-executable instructions, wherein the computer-executable instructions are used to make a centralized controller execute the method according to claim 1.

12. A method for message processing between communications systems, comprising:
   determining, by a first system, triggering of an operation event; and
   sending, by the first system, an operation event report message to a centralized controller at a first time, wherein the operation event report message comprises a user equipment identifier so that the centralized controller performs, according to the user equipment identifier in the operation event report message and when a time interval between the first time and a second time is less than a preset valid time, correlation with an operation event report message sent by a second system at the second time and stores a correlation result, wherein
   the first system is a source system corresponding to the operation event, and the second system is a target system corresponding to the operation event; or, the first system is a target system corresponding to the operation event, and the second system is a source system corresponding to the operation event,
   wherein when the time interval is greater than the preset valid time, the operation event is determined to be an invalid event, and
   wherein when the time interval is less than the preset valid time, the operation event is determined to be an valid event, and a redirection operation is performed based on the operation event.

13. The method according to claim 1, further comprising:
   starting a timer when the first report message is received;
   stopping the timer when the second report message is received; and
   reading a time of the timer, wherein the time read from the timer represents the time interval between the first time and a second time.

14. The method according to claim 12, wherein:
   the centralized controller starts a timer when the operation event report message is received from the first system;
   the centralized controller stops the timer when the operation event message is received from the second system; and
   the centralized controller reads a time of the timer, wherein the time read from the timer represents the time interval between the first time and a second time.

15. A non-transitory computer-readable medium, comprising computer-executable instructions, wherein the computer-executable instructions are used to make a network device execute the method according to claim 12.

16. The method according to claim 12, wherein the user equipment identifier in the operation event report message is an IMSI; or,
   wherein the user equipment identifier in the operation event report message is a combination of an IMSI and a TMSI; or, wherein the user equipment identifier in the operation event report message is a preset user equipment identifier.

17. The method according to claim 16, wherein if the first system is the source system, the second system is the target system, and the source system is an LTE system, before the sending, by the first system, an operation event report message to a centralized controller, the method further comprises:

sending, by the source system, the preset user equipment identifier to the target system through a core network.

18. A network device, comprising a processor and a memory, wherein the memory stores executable instructions; and when the network device runs, the processor communicates with the memory, and the processor executes the executable instructions to make the network device execute the method according to claim 12.

19. The network device according to claim 18, wherein the processor executes the executable instructions to make the network device execute the method according to claim 16.

20. The network device according to claim 18, wherein the processor executes the executable instructions to make the network device execute the method according to claim 17.

* * * * *